United States Patent [19]
Frantz et al.

[11] Patent Number: 5,586,907
[45] Date of Patent: Dec. 24, 1996

[54] BATTERY CONNECTOR

[75] Inventors: Robert H. Frantz, Newville; John T. Larkin, Jr., New Cumberland; Robert S. Correll, Jr., Harrisburg, all of Pa.

[73] Assignee: The Whitaker Corporation, Wilmington, Del.

[21] Appl. No.: 519,216

[22] Filed: Aug. 25, 1995

[51] Int. Cl.⁶ ........................................ H01R 3/00
[52] U.S. Cl. .............................. 439/500; 439/876; 429/96
[58] Field of Search .................. 439/500, 502; 429/96–100

[56]  References Cited

U.S. PATENT DOCUMENTS

| | | | |
|---|---|---|---|
| 2,731,586 | 1/1956 | Born | 429/99 |
| 3,629,793 | 12/1971 | Ettischer et al. | 439/500 |
| 3,813,637 | 5/1974 | Grebik et al. | 339/59 R |
| 4,623,206 | 11/1986 | Fuller | 439/500 |
| 4,718,742 | 1/1988 | Utoh et al. | 439/627 |
| 4,842,966 | 6/1989 | Omori et al. | 429/96 |
| 5,024,605 | 6/1991 | Kasatani et al. | 439/500 |
| 5,211,579 | 5/1993 | Seong et al. | 439/500 |

*Primary Examiner*—David L. Pirlot
*Attorney, Agent, or Firm*—Katherine A. Nelson

[57]  ABSTRACT

A connector 60 for disk-shaped batteries 40 including a housing 62 with a battery receiving cavity 74, opposed endwalls 66 having spring arms 68 that extend outwardly from the cavity 74 for retaining the battery 40 in the housing 62, a surface mountable positive terminal 77, and a surface mountable negative terminal 79. The positive and negative terminals 77,79, are disposed in respective terminal receiving passageways 72 of the housing with spring arm contact sections 80 opposing each other along the housing sidewalls and with surface mountable connecting sections 84 of both the terminals 77,79, extending outwardly from respective the housing sidewalls 64 at the bottoms thereof. The terminals are electrically engageable with battery electrodes on opposed surfaces of the battery, and the surface mountable connecting sections thereof are spaced apart at least the thickness of a the battery, being a sufficient distance from each other to prevent bridging therebetween when the connecting sections are soldered to respective circuit pads on a circuit board.

2 Claims, 4 Drawing Sheets

BATTERY CONNECTOR

FIELD OF THE INVENTION

This invention is related to connectors for batteries and more particularly to connectors for a disk-shaped cell or battery.

BACKGROUND OF THE INVENTION

Disk-shaped cells or batteries are often used as back up protection for electronic equipment should there be a failure in the conventional power system. Typically, these disk-shaped backup cells are relatively small, having, for example, a diameter of about 0.268 inches and a thickness of about 0.083 inches. The cell has a positive electrode extending along a major surface and the edge and a negative electrode extending over the other major surface and isolated from the positive electrode. For purposes of this invention the term "battery" is to be understood to include a single cell. The battery is inserted into a connector mounted to a circuit board, the connector hereinafter being referred to as a "battery connector". It is desirable that a backup battery connector require a minimum amount of space on a circuit board within the equipment, be easy to mount to the circuit board, be readily accessible for replacing a depleted battery, and be cost effective to manufacture.

In prior art battery connectors such as the example depicted in FIGS. 1 and 2, the connector has surface mountable contacts wherein the positive contact of the connector both holds the battery in the connector housing and provides the electrical connection to the positive electrode of the cell. This connector requires two different stamped and formed contacts, one of which requires a considerably greater length of a strip of metal to stamp and generates more scrap than the other. Additionally metal having the spring characteristics required by the positive terminal of the prior art is generally more expensive than the metal used for the negative terminal. The prior art connector is made by an insert molding process in which the terminals are placed in a mold and the housing is molded around them.

SUMMARY OF THE INVENTION

The present invention is directed to an electrical connector for a disk-shaped cell or battery, which includes a dielectric housing having a battery receiving cavity, and two terminal-receiving passageways extending through a bottom housing wall and into the cavity, a positive terminal and a negative terminal disposed therein. The housing further includes opposed end walls having outwardly extending resilient arm portions dimensioned to receive the battery therebetween. In the preferred embodiment, the surface mountable positive and surface mountable negative terminals are identical, each having spring arm contact sections electrically engageable with respective electrodes of the battery. The positive and negative terminals are insertable through the respective terminal-receiving passageways with spring arm contact sections opposing along the sidewalls of the housing. The surface mountable connecting sections of both of the terminals extend outwardly from the housing sidewalls at the bottom thereof. The positive and negative terminals are electrically engageable with corresponding cell electrodes on opposite sides surfaces of the cell. The surface mountable connecting sections of the positive and negative terminals are spaced apart a sufficient distance from each other to prevent bridging therebetween when the surface mountable sections are soldered to respective circuit pads on a circuit board. It is to be understood that the sufficient distance will vary depending upon the design and size of the connector and the processing requirements for the particular connector design. In one preferred embodiment, the positive and negative terminals are spaced apart at least the thickness of the cell or battery. In the preferred embodiment of the present invention, the positive and negative terminals are identical and are inserted into a previously molded housing. The resulting connector is cost effective to make and the resilient arms of the housing have sufficient resiliency and retention force to allow multiple replacements of the cell into the connector.

An embodiment of the invention will now be described by way of example with reference to the accompanying drawings.

BRIEF DESCRIPTIONS OF THE DRAWINGS

DETAILED DESCRIPTION OF THE DRAWINGS

Figure 1:
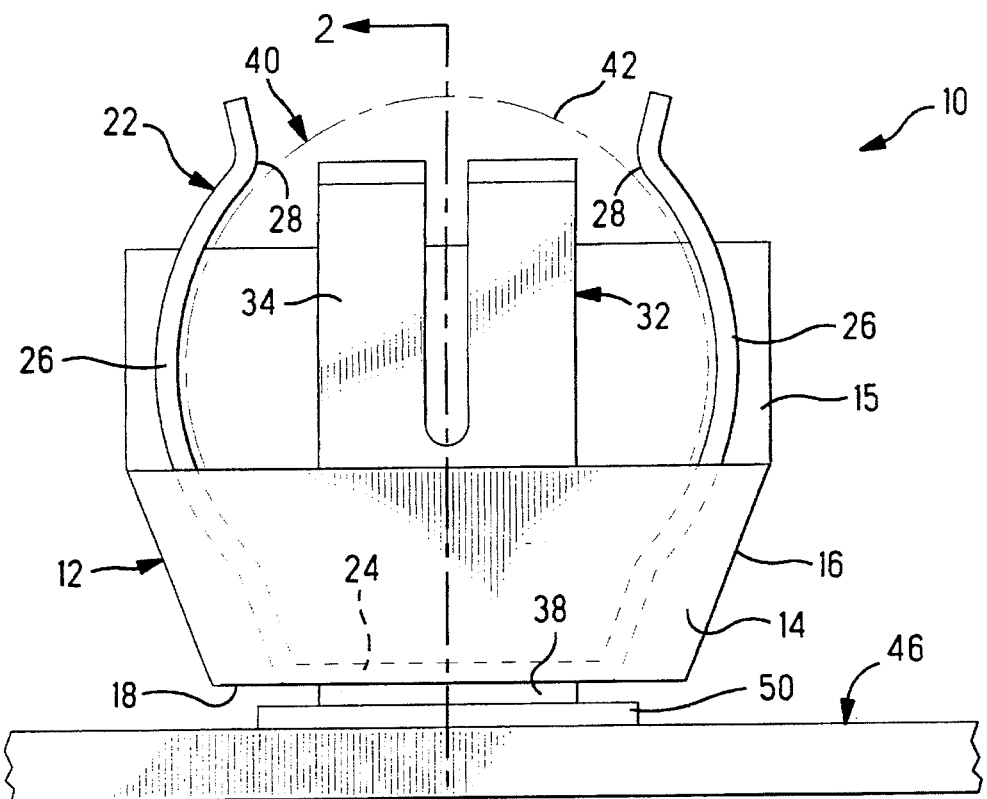
FIG. 1 is a side view of a prior art battery connector with the battery shown in phantom.
Figure 2:
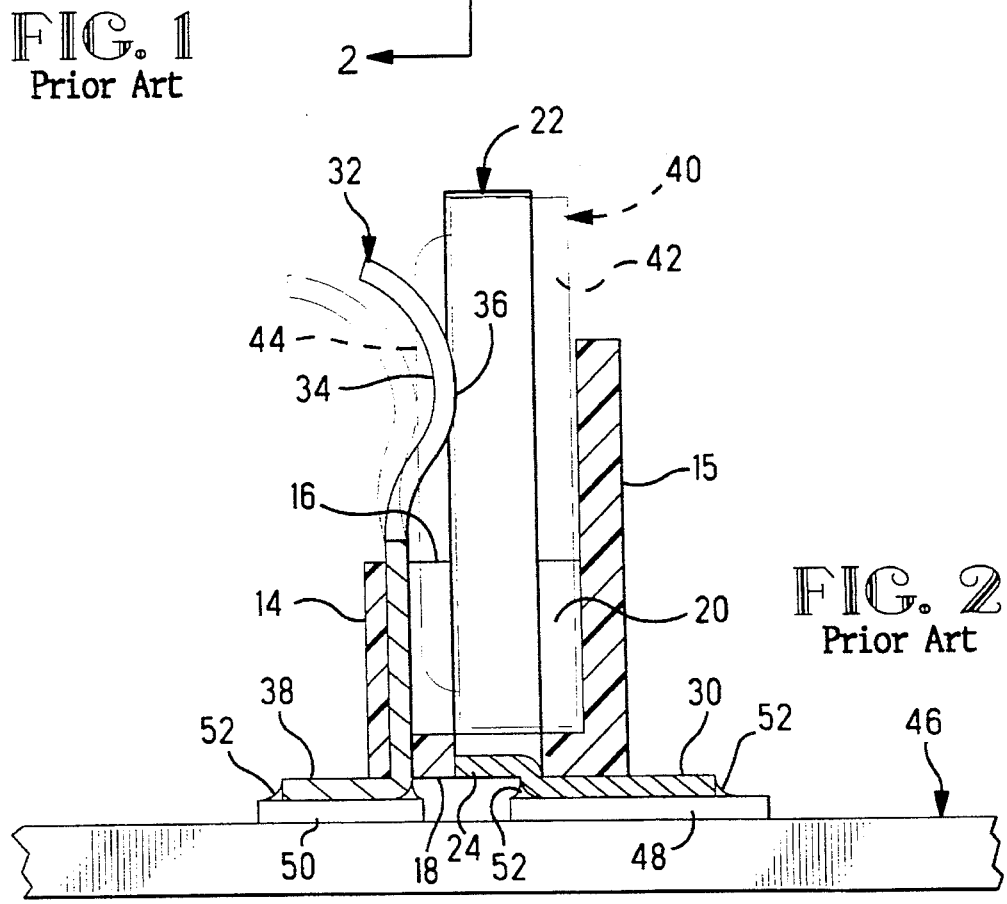
FIG. 2 is a sectional view taken along line 2—2 of FIG. 1.
Figure 3:
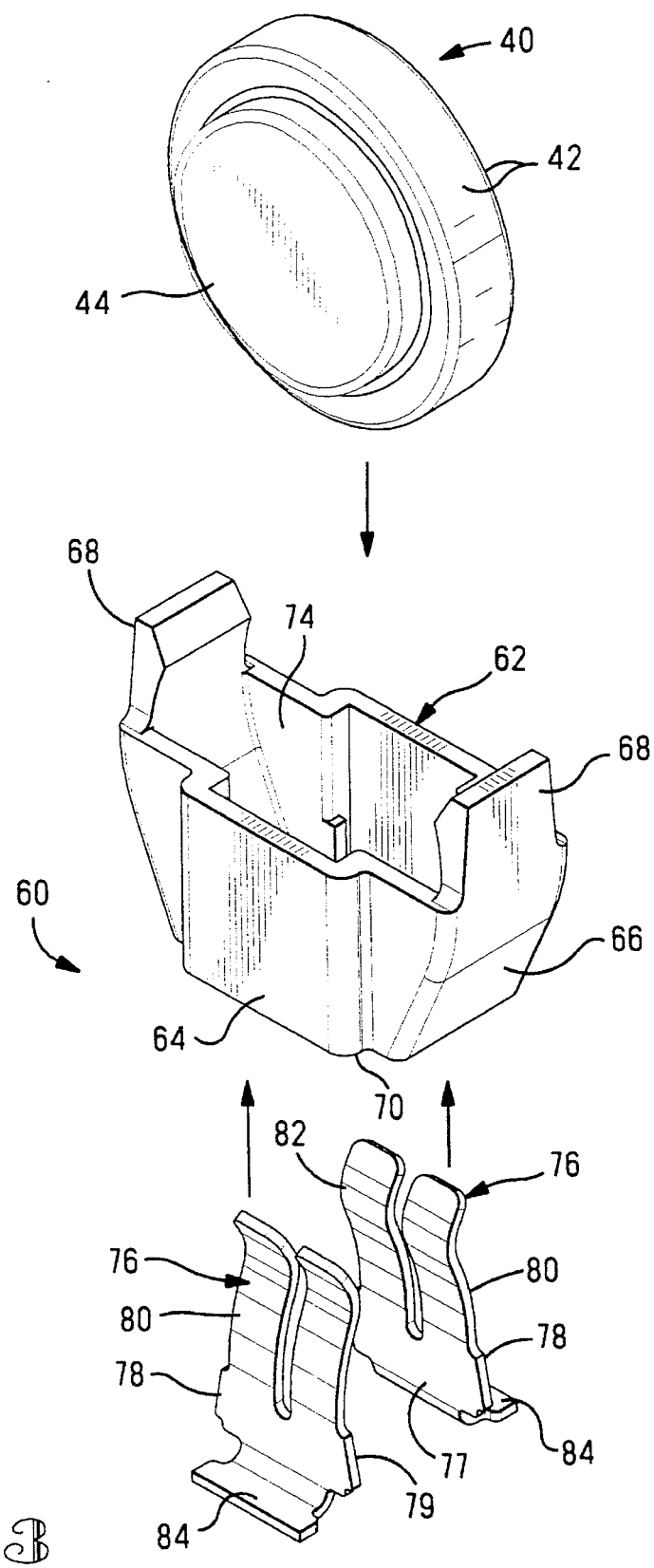
FIG. 3 is a perspective view of a battery connector of the present invention with the terminals exploded therefrom and having a battery for the connector.
Figure 4:
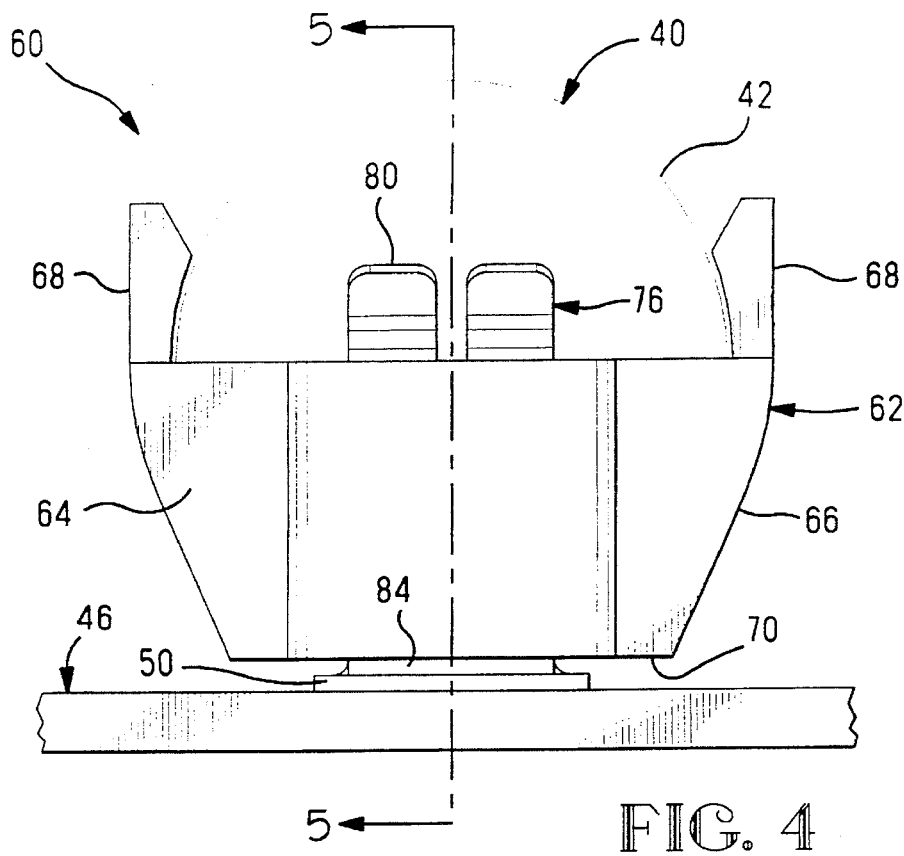
FIG. 4 is a side view of the assembled battery connector of FIG. 3 with the battery shown in phantom.
Figure 5:
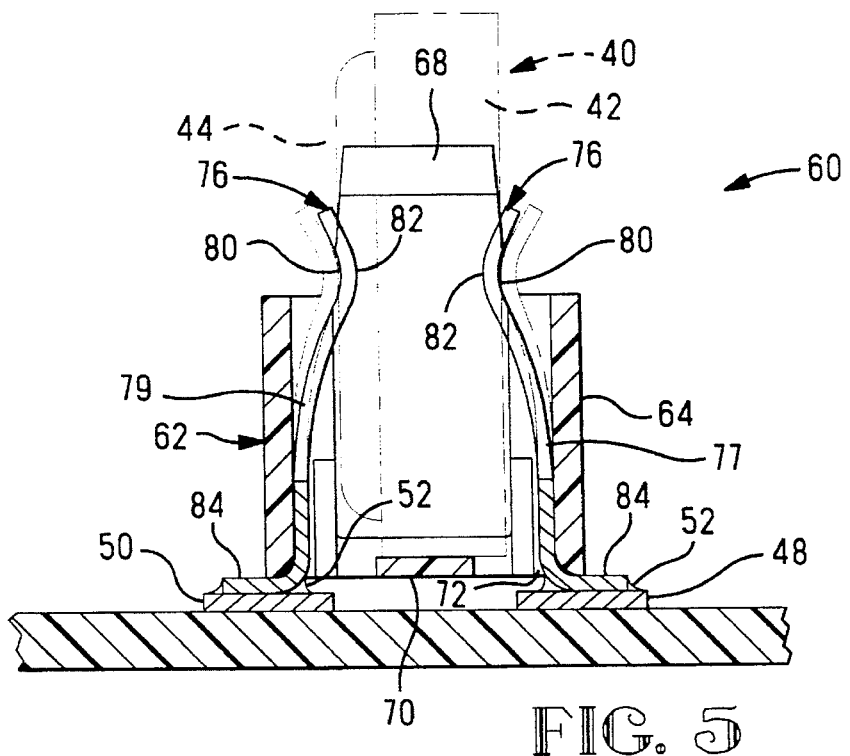
FIG. 5 is a sectional view taken along line 5—5 of FIG. 4.

FIGS. 1 and 2 illustrate the prior art battery connector 10. Connector 10 includes a dielectric housing 12 having a battery receiving cavity 20, a positive terminal 22, and a negative terminal 32. Housing 12 has opposed sidewalls 14, 15, opposed endwalls 16, and a bottom wall 18, the walls together defining a cavity 20 for receiving a disk-shaped cell or battery. The battery 40, as best seen in FIG. 3, includes a positive electrode 42 disposed on a major side surface and edge of the battery and a negative electrode 44 disposed on the other major surface and electrically isolated from the positive electrode 42. A typical battery has a diameter of about 0.268 inches and a thickness of about 0.083 inches.

As shown partially in phantom in FIG. 1, positive terminal 22 is horseshoe shaped and includes a base 24 with a pair of spring arms 26 extending therefrom and having contact surfaces 28 at the leading ends thereof for engaging positive electrode 42 of a battery 40. The spring arms 26 are adapted to hold the battery 40 within the connector 10 as well as provide electrical connection to the positive electrode 42 of the battery. The positive terminal 22 further includes an outwardly extending surface mount contact section 30, as seen in FIG. 2. The negative terminal 32 of battery connector 10 includes a pair of spring arms 34 extending in one direction and a surface mount contact portion 38 extending at right angles thereto. The spring arms 34 include contact surfaces 36 for engaging the negative battery electrode 44, as best seen in FIG. 2. As shown by the phantom line in FIG. 2, when the battery 40 is inserted into connector 10, the spring arms 34 push the battery 40 against the sidewall 15 that extends above cavity 20 thereby trapping the battery 40 between the sidewall 15 and the spring arm 34 of the negative terminal 32. The surface contact sections 30, 38, are adapted to be mechanically and electrically engaged to corresponding pads 48, 50, on a circuit board 46 with solder 52 or the like.

As can be seen in FIG. 2, the base 24 of the positive contact 22 is spaced only a short distance from the surface of the negative terminal 32. There can be a problem of bridging of the solder between the positive and negative contacts along base 18 when connector 10 is mounted to a circuit board thus rendering the battery connector 10 inoperable.

Figure 6:
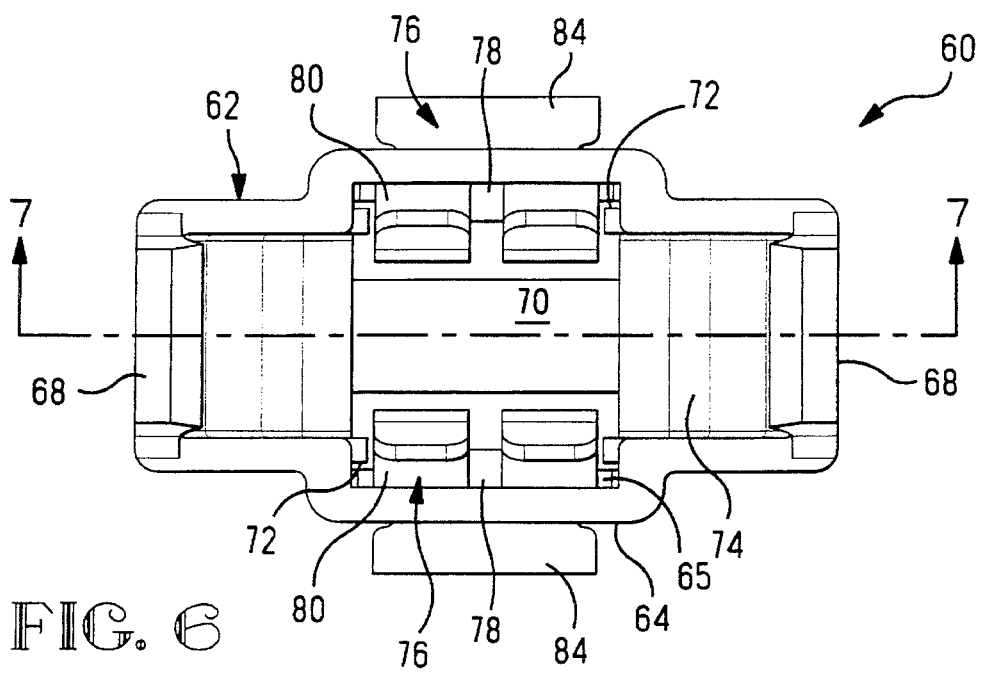
FIG. 6 is a top view of the assembled battery connector of FIG. 3.
Figure 7:
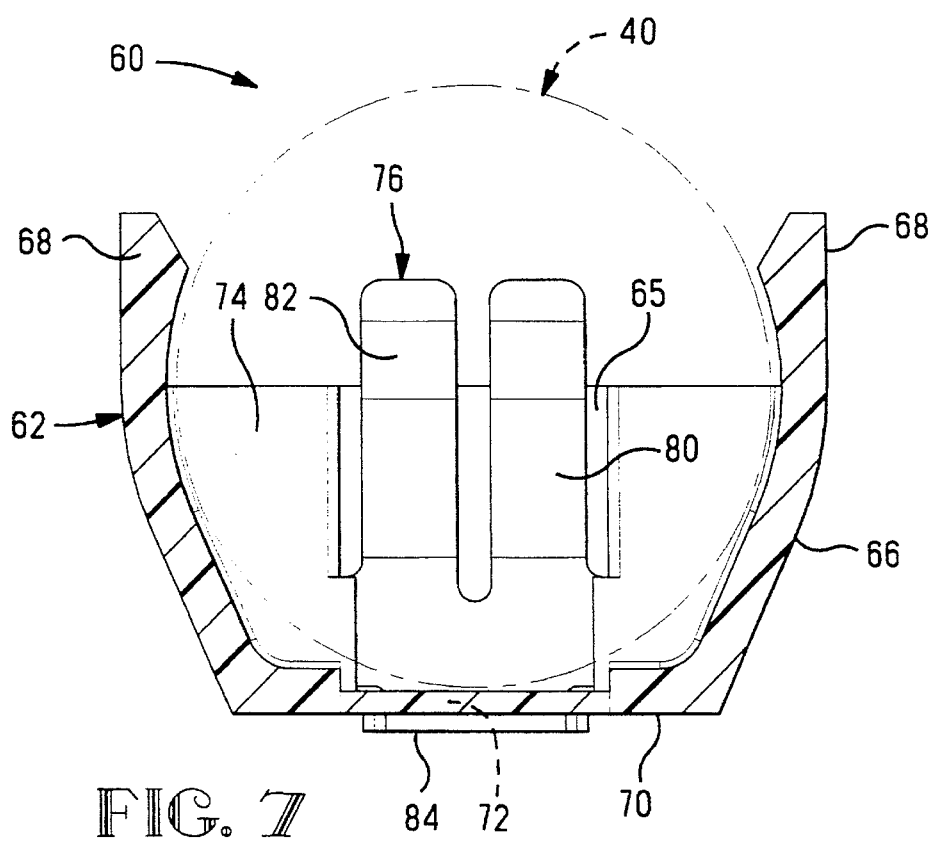
FIG. 7 is a sectional view taken along line 7—7 of FIG. 6.

Referring now to FIGS. 3 through 7, the battery connector 60 of the present invention includes a dielectric housing 62, a positive terminal 77, and a negative terminal 79. The housing 62 includes opposed sidewalls 64, endwalls 66, and a base 70 together defining a battery receiving cavity 74 adapted to receive a disk-shaped battery. Each sidewall 64 includes an outwardly directed portion 65 defining a contact receiving slot, as best seen in FIGS. 6 and 7, configured to receive a respective terminal 77,79, therein. The endwalls 66 include upwardly directed resilient arm portions 68 adapted securely hold a disk-shaped battery 40 therebetween. The base 70 includes plurality of apertures 72 for receiving the respective positive and negative terminals 77, 79.

In a preferred embodiment the positive and negative terminals 77, 79, are preferably identical and are referred to generally as 76. Terminal 76 includes a body 78 having a pair of spring arms 80 extending upwardly therefrom having contact surfaces 82 at leading ends thereof and surface mount contact portion 84.

In assembling connector 60, the positive and negative terminals 77, 79, are inserted through respective terminal receiving passageways 72 in housing base 70 with respective body portions 78 disposed in corresponding sidewall portions 65 and the spring arm contact sections 82 opposing each other along respective sidewalls 64 of the housing 62 with the surface mountable contact sections 84 of both terminals 77,79 extending outwardly from respective housing sidewalls 64 at the bottoms thereof. The spring arms 80 and the contact sections 82 thereof extend into the battery receiving cavity 74 and resile outwardly upon insertion of the battery 40 therebetween as shown in phantom in FIG. 5. As can best be seen in FIG. 5, the surface mountable portions 84 of the positive and negative terminals 77,79, are spaced apart at a distance greater than the thickness of the battery 40 and a sufficient distance from each other to prevent bridging therebetween when the surface mounted sections 84 are soldered at 52 to respective circuit pads 48, 50, on circuit board 46. Upon insertion of a battery 40 into the connector cavity 74, the resilient arm portions 68 of endwalls 66 grip the edge of the battery 40 to hold it in the connector housing 62 and the contact surfaces 82 engage the respective positive and negative electrodes 42,44.

The battery connector 60 of the present invention is more cost effective to manufacture than the prior art battery connector 10. The terminals 76 are identical, thus eliminating the need to stamp and form two different kinds of terminals. Terminals 76 are substantially rectangular, thereby minimizing waste produced during the stamping process. The terminals can be stamped from a continuous metal strip and handled while attached to a carrier strip, thus facilitating subsequent plating and automatic assembly operations. Suitable materials for the terminals of the present invention include copper alloys such as phosphor bronze and the like.

The housing 62 of the present invention is molded from a high temperature thermoplastic suitable for withstanding temperatures associated with soldering surface mounted connectors, as known in the art. The housings are molded in conventional molds rather than by insert molding. Problems associated with flashing of plastic on the closely spaced terminals in the insert molded prior art connector also are eliminated.

The present invention provides a battery connector for disk-shaped batteries that may be easily soldered to a circuit board while preventing bridging between the respective circuit mount contact sections and is cost effective to manufacture.

It is thought the battery connector of the present invention and many of its attendant advantages will be understood from the foregoing description. It is apparent that various changes may be made in the form, construction, and arrangement of parts thereof without departing from the spirit or scope of the invention, or sacrificing all of its material advantages.

We claim:

1. A battery connector for disk-shaped batteries comprising:

a dielectric housing having opposed sidewalls, opposed endwalls and a bottom wall together defining a battery receiving cavity, said bottom wall including two terminal receiving passageways extending therethrough, one proximate each sidewall;

said endwalls of said housing extend outwardly from said housing and beyond said battery receiving cavity to define spring arms at leading ends thereof dimensioned to receive said battery therebetween and retain said battery in said housing cavity;

a surface mountable positive terminal and a surface mountable negative terminal, each having spring arm contact sections electrically engageable with a respective battery electrode, and surface mountable connecting sections, said positive and negative terminals being insertable through respective terminal receiving passageways with said spring arm contact sections opposing each other along said sidewalls of said housing and said surface mountable connecting sections of both said terminals extending outwardly from respective said housing sidewalls at the bottoms thereof;

whereby said positive and said negative terminals are electrically engageable with battery electrodes on opposed surfaces of said battery, and surface mountable connecting sections of said positive and negative terminals are spaced apart at least a sufficient distance from each other to prevent bridging therebetween when said connecting sections are soldered to respective circuit pads on a circuit board.

2. The battery connector of claim 1 wherein said surface mountable connecting sections of said positive and negative terminals are spaced apart at least the thickness of a said battery.

\* \* \* \* \*